United States Patent [19]

Sorensen et al.

[11] Patent Number: 4,520,618
[45] Date of Patent: Jun. 4, 1985

[54] CUTTER GUARD

[75] Inventors: Wayne E. Sorensen, West Des Moines; Larry E. Johnson, Indianola, both of Iowa

[73] Assignee: Herschel Corporation, Indianola, Iowa

[21] Appl. No.: 664,086

[22] Filed: Oct. 23, 1984

Related U.S. Application Data

[63] Continuation of Ser. No. 612,665, May 21, 1984, abandoned, which is a continuation of Ser. No. 425,688, Sep. 28, 1982, abandoned.

[51] Int. Cl.³ .............................................. A01D 55/10
[52] U.S. Cl. ...................................... 56/310; 56/298; 56/307
[58] Field of Search ................ 56/17.2, 305, 307, 308, 56/310, 311, 298

[56] References Cited

U.S. PATENT DOCUMENTS

| 1,064,074 | 6/1913 | Howk | 56/305 |
| 1,185,442 | 5/1916 | Southwick | 56/310 |
| 3,171,242 | 3/1965 | Scarnato et al. | 56/310 |
| 3,314,222 | 4/1967 | Scarnato et al. | 56/305 |
| 3,401,513 | 9/1968 | Rickerd | 56/298 |
| 3,553,948 | 1/1971 | White | 56/307 |
| 4,248,034 | 2/1981 | Jackson et al. | 56/17.2 |

FOREIGN PATENT DOCUMENTS 1188346  3/1965  Fed. Rep. of Germany ....... 56/17.2

Primary Examiner—Paul J. Hirsch
Attorney, Agent, or Firm—Merchant, Gould, Smith, Edell, Welter & Schmidt

[57] ABSTRACT

The present invention is an improved cutter guard having means for positioning the guard in either a first position or a second position upon a respective cutter bar assembly. The positioning means includes a pair of partially overlapping openings aligned along an axis. The overlapping areas of the pair of openings define a reduced passageway which prohibits a bolt inserted into one of the openings from moving across the overlapping areas into the other opening.

1 Claim, 7 Drawing Figures

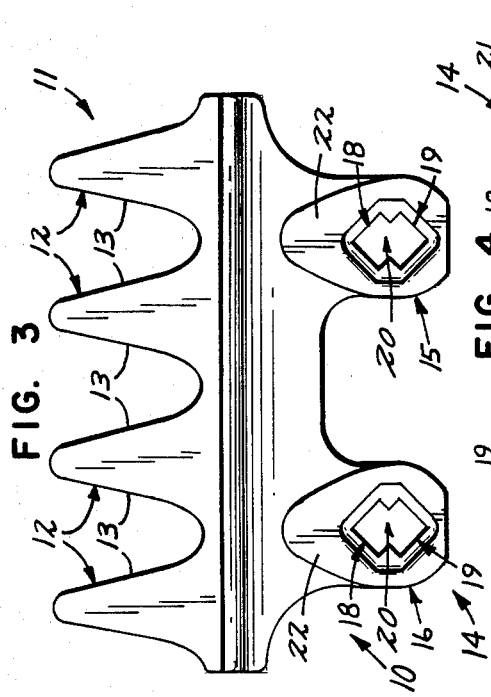
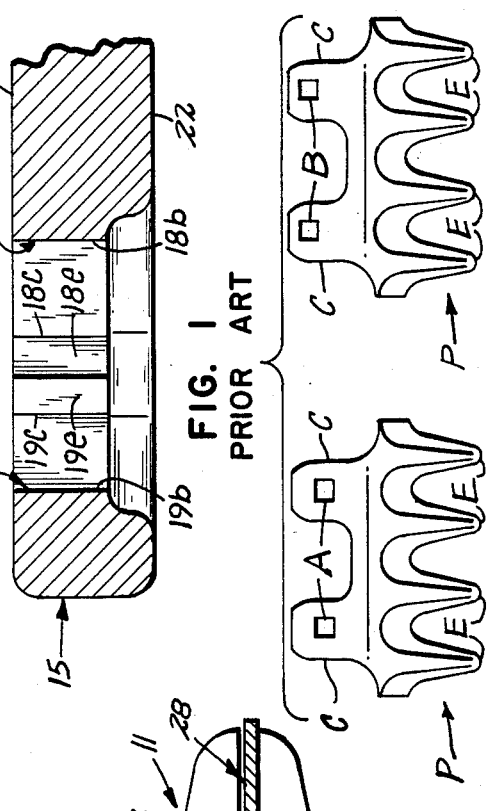
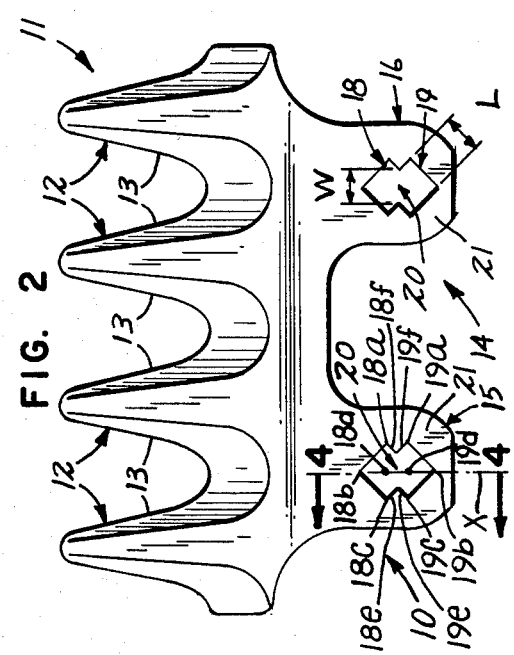
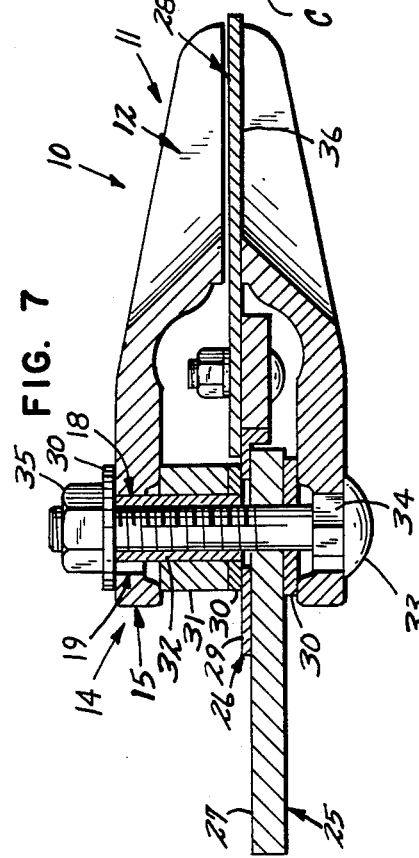

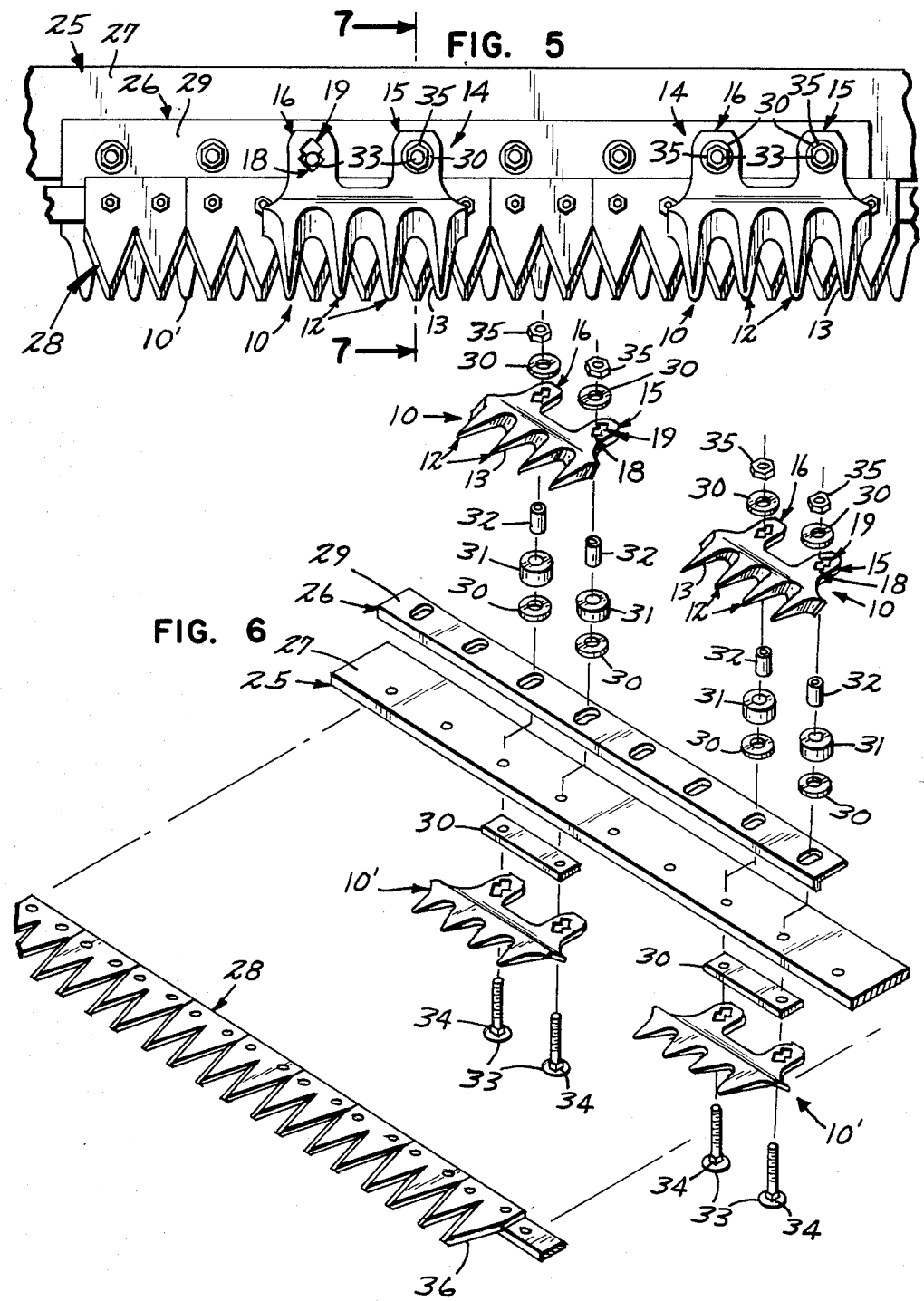

CUTTER GUARD

This is a continuation of application Ser. No. 612,665 filed May 21, 1984 now abandoned which is a continuation of application Ser. No. 425,688 filed Sept. 28, 1982 now abandoned.

TECHNICAL FIELD

The present invention relates to guards for protecting the sickle or blade of a cutter assembly for a harvesting machine, and more particularly to a guard which provides alternative mounting positions for the guard with respect to the assembly.

BACKGROUND

Guards for the sickle or blade of a cutter assembly typically have a forward prong portion and a rearward attachment portion. The attachment portion contains the means for securing the guard upon the assembly. In the prior art such securing means consisted of an opening positioned a predetermined distance from the respective prong portion. Each opening is designed and constructed to receive a bolt and thereby secure the guard in a particular position relative to the sickle or blade lying adjacent thereto.

Over the years manufacturers of machines with cutter assemblies have essentially standardized the relative position of the guard with respect to the remainder of the assembly. Such standardization efforts have resulted in two locations of the openings on a guard for attachment to the cutter assembly. Each guard, however, would contain only one standard opening arrangment and not both. Therefore, the purchaser of the guard would have to know which particular opening arrangement the machine required in order to purchase the proper guard.

To date no universal guard, having an opening arrangement compatible with both standardized positions for mounting a guard upon a cutter assembly, has been available. Such a universal guard would reduce manufacturing and inventory costs, as well as reduce the problems inherent with a purchaser having to know which standard opening arrangement a machine required. The present invention solves the problem by providing a universal guard having an opening arrangement which satisfies the requirements of both standardized mounting arrangements.

SUMMARY

The present invention is an improvement in cutter guards for a sickle or blade in a cutter assembly. The guard includes a forward or leading prong portion and a rearward or trailing attachment portion for securing the guard to the cutter bar of the assembly. Specifically, the present invention is an improved means for positioning the guard in either a first position or a second position relative to the remaining cutter bar assembly. The positioning means includes a pair of substantially square openings aligned along an axis, with each opening having an area which partially overlaps a like area of the other opening. The overlapping areas define a reduced passageway between the openings such that a bolt inserted into one of the openings is prevented by the reduced passageway from slipping or moving into the other opening. In this manner the present invention allows the guard to be used on either of the two known standardized mounting arrangements for cutter bar assemblies. The present invention provides a universal guard which eliminates the need for two separately manufactured guards each having a single standardized opening arrangement.

BRIEF DESCRIPTION OF THE DRAWINGS

FIG. 1 is a top plan view of two prior art cutter guards.

FIG. 2 is a top plan view of a cutter guard and the present invention.

FIG. 3 is a bottom plan view of the cutter guard and the present invention shown in FIG. 2.

FIG. 4 is a view in cross-section of the present invention as seen generally along lines 4—4 in FIG. 2.

FIG. 5 is a top plan view showing the present invention as mounted in one standard position in a cutter bar assembly.

FIG. 6 is an exploded view in perspective illustrating the various parts of the cutter bar assembly shown in FIG. 5.

FIG. 7 is a view in cross-section of the cutter bar assembly as generally seen along lines 7—7 in FIG. 5.

DETAILED DESCRIPTION OF THE PREFERRED EMBODIMENT

The present invention is an improvement in cutter guards used in cutter assemblies of machines, such as harvesting machines or combines. A cutter guard is positioned in the assembly so as to overlie and/or support the sickle or blade of the assembly. A typical guard used in such an assembly has a forward or leading prong section and a rearward or trailing section which is attached to the cutter bar of the assembly.

As discussed above, a certain degree of standardization exists in the industry for mounting a guard to a cutter bar assembly. Essentially, the prior art consists of two mounting arrangements. These two prior art arrangements are illustrated in FIG. 1 of the drawings. Each prior art guard has a prong portion, P, and an attachment portion which includes two spaced apart, rearwardly extending members, C, with each member having an opening therein. Briefly, to mount either of the prior art guards on an assembly, a bolt is inserted through a respective guard opening and an aligned cutter bar opening and this arrangement is secured by means of a lock nut.

It will be apparent from a study of FIG. 1 that the two prior art guards are identical in all respects except for the location or distance of the openings with respect to the leading edge E of the prong portion. One of the guards has a more forwardly located pair of openings, A, with the other guard having a more rearwardly positioned pair of openings, B. Thus, the distance from the center point of opening A to a leading edge E of one guard is less than the distance from the center point of opening B to a similar leading edge E of a like cutter guard. Each of these guards and their respective openings provide one of two standard mounting positions for the guard with respect to the remaining parts of the cutter bar assembly. Neither of these prior art guards is able to satisfy the distance requirements of both standard mounting arrangements.

Referring now to FIGS. 2-4 the present invention may be understood and its improvement over the prior art guards of FIG. 1 appreciated. As in the prior art, the guard 10 of the present invention has a forward or leading prong section 11 with a plurality, e.g. four, spaced-apart individual prongs 12. Each prong 12 has a sharp, shearing edge or surface 13 which is contiguous with a like surface or edge of the adjacent prong. Extending rearwardly from the prong section and in a plane parallel to but raised from that of the prong section 11, is the attachment portion 14 of the guard 10. The attachment portion 14 consists of two, spaced-apart members or fingers 15, 16 both lying in the same plane. Each member 15, 16 includes the present invention, i.e. means for positioning the guard in either a first standard position or a second standard position relative to the remaining parts of the cutter bar assembly. As the positioning means for each attachment portion member is identical to that of the other member, the following discussion of the present invention will be limited to a description with respect to one member only.

In FIG. 2 a longitudinal axis, X, is represented by broken lines, the same lines which identify the cross-sectional view shown in FIG. 4. Located along this axis is the positioning means of the present invention. In the preferred embodiment the positioning means includes a pair of partially overlapping openings. Each pair of openings has a forward opening 18 and a rearward opening 19. Each opening 18, 19 is substantially square in shape and has three distinct corners, 18a, 18b, 18c, 19a, 19b, 19c respectively as well as an undefined corner located in the overlapping area of the opening pair. The openings 18, 19 in each pair are substantially identical in shape and size. Each opening 18, 19 is arranged on the axis, X, such that one of its respective corners 18b, 19b and its respective center point, 18d, 19d lie on the axis X. The resulting configuration of the overlapping openings appears similar to that of a sharp-cornered figure eight having an apex at either end and a narrowed central area defined by the overlapping areas of the opening pair. The central overlapping area or the reduced passageway 20 connecting the pair of openings 18, 19 is defined by a portion of the perimeter of each opening, namely shortened sides 18e, 18f, 19e, 19f respectively. This reduced passageway prevents a bolt inserted in either opening 18, 19 from moving across the overlapping area 20 into the other opening 19, 18, respectively, thereby securely maintaining the position of the bolt in the selected opening.

The unique aspect of the present invention is its ability to function as a universal guard which may be used in either of the two standard mounting arrangements defined by the prior art. Thus, the present invention eliminates the need for two separate guards each having only one of the two opening arrangements as shown in FIG. 1. The forward opening 18 of the present invention satisfies the distance requirements of opening A in the prior art, and the rearward opening 19 satisfies the requirements of prior art opening B. The forward opening 18 allows the guard to be placed in a first position with respect to the rest of the cutter bar assembly, and the rearward opening 19 allows the guard to be mounted in a second position. In this manner, the present invention provides an improved, universal attachment which allows the same guard to be positioned in either of two standard positions with respect to a cutter bar assembly.

To make the present invention, the guard 10 may be forged from a suitable material such as steel. The pair of openings 18, 19 are cut in each member 15, 16 of the attachment portion 14 and each opening extends from the top surface 21 through to the bottom surface 22 of each member 15, 16. See FIGS. 2-4. The width W, of the reduced passageway should be less than the length L, of each opening side to insure there is no movement of a bolt across the passageway 20. The size of the opening will be determined by the existing cutter bar opening size and the bolt used to secure the two parts together. The distance the center points of the opening pair are positioned apart from each other is determined by the difference in the positioning requirements of the two standard arrangements for the guard relative to the cutter bar.

To illustrate one use of the present invention in a cutter bar assembly, a portion of an assembly is shown in FIGS. 5-7. Referring now to FIGS. 5-7 it can be seen that the guard is positioned on the assembly in its first or forward position.

FIG. 5 illustrates a fully assembled portion of a cutter bar assembly for a harvesting machine. In FIG. 6 the various parts of that assembly are shown in the order in which they are secured together. The harvesting machine includes an existing cutter bar 25. A wear plate 26 is positioned upon an upper surface 27 of the cutter bar. The sickle 28 is positioned relative to the wear plate 26 at a location forward from the securement of the wear plate 26 to the cutter bar 25. See FIG. 7. On the top surface 29 of the wear plate 26 a number of shims 30, spacers 31, and bushings 32 are provided in order to securely contain a conventionally designed carriage bolt 33 which is inserted through the respective openings in the guard 10, the wear plate 26 and the cutter bar 25. In this particular assembly a second guard 10', is conventionally arranged in a continuous row along the bottom surface 36 of the sickle 28. Only two of such guards 10' are shown in FIG. 6. The carriage bolt 33 is inserted from the bottom of the assembly upwardly through the aligned openings of the respective parts and secured in that position by the use of a hex or lock nut 35 at the free end of the bolt 33.

The conventionally designed carriage bolt 33 used in the present invention includes the standard round head and immediately below the head a square portion 34 is provided which substantially occupies one of the square openings of the present invention. The square portion 34 further prevents rotation of the bolt within its position.

From the foregoing it can be appreciated that the present invention provides a universal means for positioning a cutter guard in either of two standard arrangements upon a cutter bar assembly. Of course, modifications of the preferred embodiment may be made by those skilled in the art, and therefore it is believed the scope of the invention is limited only by the scope of the claims which follow.

What is claimed is:

1. A guard for a cutter bar of a harvesting machine, the guard having a leading prong section, and a trailing section for attachment with a bolt having a square portion to the cutter bar, said trailing section including a pair of spaced-apart, outwardly extending members, each of said members having a longitudinal axis, wherein the improvement comprises means at said trailing section for positioning said guard in either a first position or a second position on the machine cutter bar, said positioning means including a central portion on each of said members containing a forward opening and a rearward opening aligned with respect to each other, each of said respective openings of said members being substantially square in shape and having a center point and at least one corner located on said respective extending member axis, each opening including an area overlapping a like area of said other opening, said overlapping area defining a reduced passage to prevent said bolt from inadvertently moving from one of said first and second position to the other.

* * * * *